Aug. 26, 1958    C. M. MacDONALD    2,849,518
TEMPERATURE INDICATOR
Filed Oct. 12, 1953
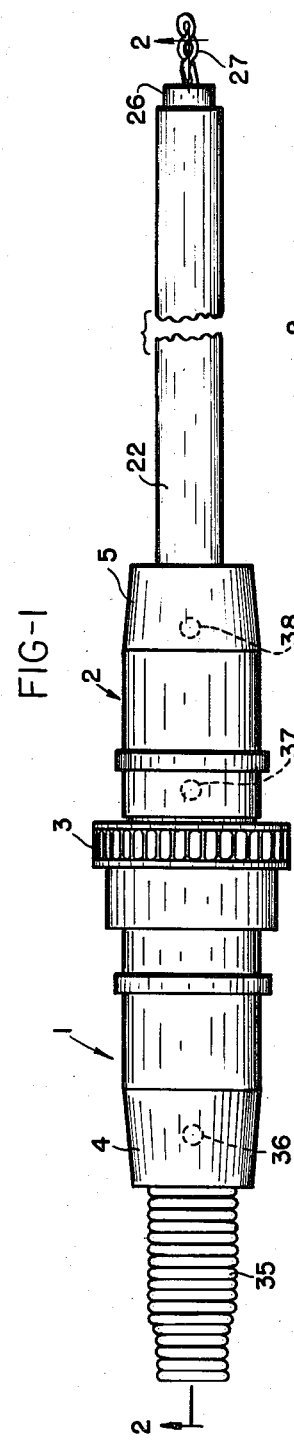
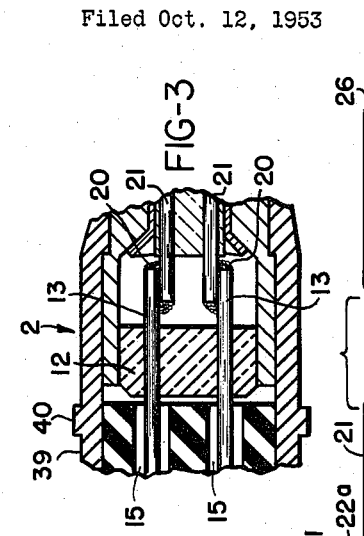
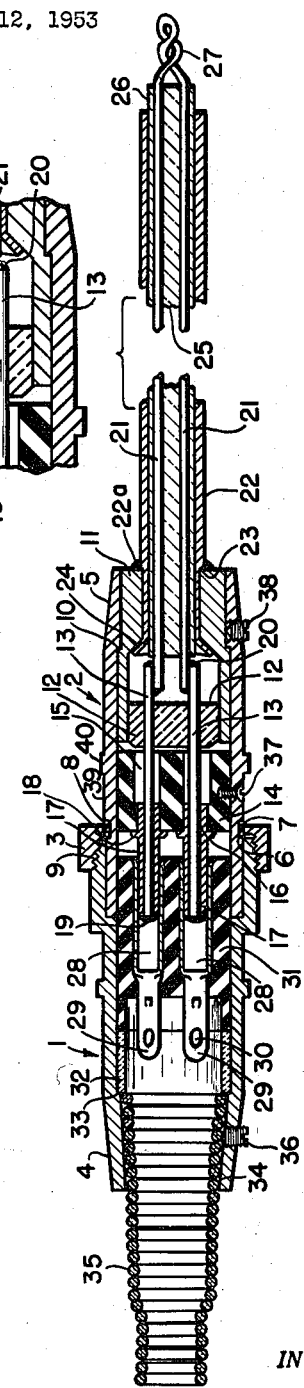
INVENTOR.
CHARLES M. MacDONALD
BY Toulmin & Toulmin
ATTORNEYS United States Patent Office 2,849,518
Patented Aug. 26, 1958

2,849,518
TEMPERATURE INDICATOR
Charles M. MacDonald, Cincinnati, Ohio
Application October 12, 1953, Serial No. 385,566
3 Claims. (Cl. 136—4)

The present invention relates to high temperature indicators, and more particularly to thermo-couple devices which measure high temperatures of liquids or gases at positions considerably within the body of the liquid or gas.

Temperature indicators of this type usually employ a thermo-couple which extends beyond a long protecting tube for insertion into the liquid or gas body. Such indicators are useful in determining temperatures of beer contained in vats.

A thermo-couple may comprise metals widely spaced in electromotive series, such as nickel and zinc, which, when in contact and caused to be heated, generate a minute but indicatable electric voltage. This voltage, when calibrated and, if necessary, amplified, becomes a measure of the temperature.

The thermo-couple wires are carried through the long tube and insulated therefrom, and from one another, by ceramic material, leaving a portion of the wires to extend beyond the tube and twisted together to form a thermo-couple junction.

In order to prevent the liquid or gas from travelling up the long tube by capillary action, or otherwise, it has been the practice to provide a long liquid-tight ceramic plug between the tube and the contained wires. But due to the high temperatures and sometimes high pressures of the material being measured, also the rapid changes of these temperatures and pressures, the tightly fitted ceramic plugs would crack, perhaps allowing one or both of the wires to contact the metal protecting tube or one another.

The primary object of the invention is to provide a temperature indicator of the thermo-couple type which is inexpensive, accurate of measurement, and has a long operating life.

Another object is to provide a temperature indicator employing a thermo-couple, also a long protecting tube containing the leads of the couple and in which the leads are insulated from the tube and from the body of the indicator by a loosely fitted plug which is subjected to no strain or stress as the tube is heated within the liquid or gas.

Still another object is to provide a temperature indicator of the thermo-couple type employing a long metal protective tube for the thermo-couple leads, and in which the insulation between the leads and the tube is prevented from deterioration and failure.

An additional object is to provide a temperature indicator of the thermo-couple type and in which the interior of the indicator is sealed from the body, the temperature of which is being taken, by a seal remote from the material which insulates the thermo-couples wires within the indicator.

Still another object is to provide a temperature indicator of the thermo-couple type having long leads for the thermo-couple insulatingly supported within a metal tube, these leads terminating in bare contacts for a plug and jack arrangement, together with a seal between the position of the long leads and the position of the plug and jack arrangement.

Other objects and features will be apparent as the specification is perused in connection with the accompanying drawings, in which:

Figure 1 represents an elevational view of the improve thermo-couple temperature indicator;
Figure 2 is a vertical sectional view of the indicator showing the leads in elevation for clearness; and
Figure 3 is a fragmentary sectional view, somewhat enlarged, of the seal between the leads of the thermocouple and the body of the container.

Referring to the drawings, the improved temperature indicator is comprised initially of two portions, generally designated 1, 2, which are joined together in alignment by a knurled nut 3 so that by loosening this nut the portions 1, 2 can be separated from one another, as will be explained hereinafter.

These portions 1, 2 are constituted of cylinders made of brass, nickel plated, and their ends are tapered as indicated at 4, 5. The cylinder 2 is provided with a shoulder 6 against which rests a ring washer 7, this washer being forced against the shoulder by a radial lip 8 on the knurled nut 3, the latter being threadedly attached to a threaded portion 9 formed on the cylinder 1. Thus, when the knurled nut is tightened, the cylinders 1, 2 are held rigidly in alignment at the shoulder 6.

The right-hand end of the cylinder 2 is formed with a shouldered opening 10 which receives a seal cup 11 constituted of metal having a coefficient of expansion comparable to that of glass.

At the left-hand end of the seal cup, as seen in Figure 2, there is sealed a glass plug 12 through which wires 13 project. In case this plug is constituted of a hard glass such as that sold on the market under the name "Pyrex," the seal cup 11 and the wires 13 can be advantageously made of so-called "Kovar" which constitutes approximately 20% nickel, 17% cobalt, .02% manganese, and the balance, iron.

Thus, the glass plug 12 and the sealing cup 11 have substantially the same co-efficient of expansion in order that there will be no leakage between the plug 12 and the cup 11, also the conductors 13, at the high temperatures to which the indicator might be subjected.

The leads 13 pass through a fiber plug 14 having hollowed-out bores 15 at positions where the leads enter the plug. The plug has two openings 16 for receiving metal pins 17 which are held against the plugs 14 by means of flanges 18. The lead-in wires 13 pass through the pins 17 and are silver soldered thereto at their ends as indicated at 19. At their opposite ends the lead-in wires 13 are silver soldered or welded, as indicated at 20, to a long pair of conductors or lead-in wires 21 which are of thermostatic character. The metal of these wires are widely spaced in the electromotive series and when joined together, as explained hereinafter, develop an electromotive force at the junction under heat.

For this purpose, one of the wires 21 may be constituted of nickel and the other wire constituted of zinc. They extend through a long metal tube 22, this tube being provided with a shoulder 23 and a flared-out end 24 which fits snugly within the bore of the cup 11. A silver solder fillet 22A may be applied between the end of the cup 11 and the tube 22 at the shoulder 23. This tube may be constituted of steel and its length depends upon the depth at which it is desired to submerge the thermostatic coupling. In normal size indicators this may run from 8" to 9" long.

In order to insulate the wires 21 from the interior of the tube, ceramic insulators 25 may be employed, these insulators extending the full length of the tube and slightly beyond, as indicated at 26. The insulator 25 is not fitted tightly within the steel tube, nor is there a tight connection between the longitudinal holes in the insulator and the wires 21. It is sufficient that the insulator serve merely to insulate the wires from one another and from the steel tube.

The thermostatic wires 21 project beyond the ceramic tube, or any suitable insulating material, and are twisted three full turns, as indicated at 27, to provide sufficient material for a fusion weld, or the wires may be formed to meet end to end to make a butt joint. The wires are preferably joined together at their ends by means of a fusion weld or by a globule of silver solder (not shown).

The portion 1 or cylinder includes a socket structure, of which the pins 17 constitute the male members. The sockets 28 are hollow and snugly but slidably accommodate the pins 17 when the parts 1 and 2 are brought into longitudinal alignment and are held in that position by the nut 9.

The sockets 28 terminate in a flat member 29 having openings 30 to facilitate the attachment of leads. The socket is held within the cylinder 1 and insulated therefrom by a fiber bushing 31. A spacer 32, also of fiber, may be used to press the end of the bushing 31 from a shoulder 33 formed within the cylinder 1. Thus, the bushing 31 is rigidly held in place.

The tapered end 4 is provided with a tapered bore 34 for receiving a flexible tube 35 constituted of a spring-like element and lead-in conductors (not shown) pass through the interior of the tube 35 for connection to the flat members 29 of the sockets 28. A set screw 36 may pass through the tapered end 4 of cylinder 1 to hold the tube 35 in position, and additional set screws 37, 38 may pass through the cylinder 2 for holding the plug 14 and the cup 11 in position.

Thus, all of the internal elements within the cylinders 1, 2 are positioned longitudinally of the cylinders 1, 2. None of these elements need make a hermetic or fluid seal with respect to the cylinders 1, 2 except that the glass plug 12 is hermetically sealed to the cup 11 and to the leads 13, and the cup is so tightly fitted within the container 2 that no gas or liquid can possibly get beyond the Pyrex glass plug and the Kovar metal cup when the thermo-couple 27 is immersed deeply into liquid or gas, the temperature of which is being measured or indicated.

The various parts within each of the cylinders 1, 2 can be readily inspected and cleaned or repaired when necessary by simply loosening the nut 3 to allow this nut to slide over the surface 39 as far as the shoulder 40 carrying with it the ring or washer 7. The pins 17 are then slidably removed out of the sockets 28.

The separation of the two cylinders 1, 2 in the manner stated is of great convenience, particularly if the cylinder 1 is more or less fixed in position as when leads of limited length pass through the flexible tube 35 and are attached to the connectors 29. A fast disconnect of the thermo-couple cylinder 2 can be made at the plug and jack arrangement.

In operation, when the thermo-couple 27 is immersed in liquids or gases, of various temperatures, an electromotive force is generated at the junction of the thermostatic wires 27 and this causes current to pass through the leads 21, 13 and to the sockets 28 where the current is carried by wires passing through the flexible conduit 35. At this point the current can be applied to any sensitive detecting instrument, millivoltmeter, milliammeter or galvanometer, calibrated in terms of temperature or, if desired, the current can be amplified in a suitable or well known manner and carried to proper indicating devices.

From the foregoing it is evident that I have disclosed an improved thermo-couple temperature indicator in which the thermo-couple 27 is positioned at any desired distance from the cylinders 1, 2 where the plug-in and plug-out operations are effected and this thermo-couple is carried on an insulator 25 contained within a long steel tube 22.

Whereas heretofore the insulator, which is usually of ceramic material, was fitted tightly within the metal cylinder so as to effect a hermetic and liquid seal, I have found that this is not only a very expensive job to perform, but there is also the tendency for the insulator to crack or become porous on account of its extreme length and due to wide temperature variations to which the thermocouple may be subjected. However, in accordance with my invention, the hermetic and liquid seal is obtained at a position within the tube 2 by reason of the glass plug 12 and its surrounding cup 11 which is far removed from the point of the intense heat at the thermo-couple 27 and therefore is not subjected to heat stress or strain. My improved thermo-couple temperature indicator therefore has considerably longer life than devices of the character in which the sealing is obtained solely at the ceramic insulator.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent, is:

1. A thermo-couple temperature indicator comprising a tubular metal casing, a thermo-couple comprising metal leads supported by and extending axially of said casing, an elongated metal tube enclosing the metal leads of the thermo-couple, insulating material disposed between said metal leads and said metal tube, a cylindrical shaped metal cup having a coefficient of expansion substantially that of glass snugly fitting in the outer end of said casing and extending coaxially thereof, said metal cup having a cylinder-shaped inner end portion defining a chamber, and a ceramic plug fitted into said inner end portion and sealing said chamber, said plug and said metal cup having substantially the same coefficient of expansion, and said plug being of substantially uniform thickness throughout its length.

2. A thermo-couple temperature indicator comprising a tubular metal casing, a thermo-couple comprising metal leads supported by and extending axially of said casing, an elongated metal tube enclosing the metal leads of the thermo-couple, insulating material disposed between said metal leads and said metal tube, a cylindrical shaped metal cup having a coefficient of expansion substantially that of glass snugly fitting in the outer end of said casing and extending coaxially thereof, said metal cup having a hollow shouldered inner end portion of greater diameter than its outer end portion and defining a chamber, and a glass plug fitted into said inner end portion and sealing said chamber, said plug and said metal cup having substantially the same coefficient of expansion, and said plug being of substantially uniform thickness throughout its length.

3. A thermo-couple temperature indicator comprising a tubular metal casing, a thermo-couple comprising metal leads supported by and extending axially of said casing, an elongated metal tube enclosing the metal leads of the thermo-couple, insulating material disposed between said metal leads and said metal tube, a cylindrical shaped metal cup having a coefficient of expansion substantially that of glass snugly fitting in the outer end of said casing and extending coaxially thereof, said metal cup having a cylinder-shaped inner end portion defining a chamber, a ceramic plug fitted into said inner end portion and sealing said chamber, said plug and said metal cup having substantially the same coefficient of expansion, and said plug being of substantially uniform thickness throughout its length, and leading-in conductors extending through said plug and sealed thereto which conductors are connected to said thermo-couple leads within said chamber.

References Cited in the file of this patent

UNITED STATES PATENTS

| | | | |
|---|---|---|---|
| 1,054,442 | Nice | Feb. 25, | 1913 |
| 2,002,532 | Flatley | May 28, | 1935 |
| 2,149,448 | Lederer et al. | Mar. 7, | 1939 |
| 2,412,564 | Current | Dec. 17, | 1946 |
| 2,445,159 | Tegge | July 13, | 1948 |
| 2,476,099 | Knudsen | July 12, | 1949 |
| 2,581,229 | Battey | Jan. 1, | 1952 |
| 2,625,573 | Connell | Jan. 13, | 1953 |
| 2,631,179 | Bell | Mar. 10, | 1953 |
| 2,649,489 | Turkington | Aug. 18, | 1953 |